United States Patent
Miura et al.

[11] Patent Number: 5,266,367
[45] Date of Patent: * Nov. 30, 1993

[54] ARTIFICIAL SNOW GRANULE

[75] Inventors: Yuichiro Miura, Sapporo; Kazuo Hirano, Tokyo; Takayuki Nate, Yokohama; Taiji Kambayashi, Yamatotakada; Masahisa Ohtsuka, 2191-1, Kamikoizumi, Ohizumimachi, Ohara-gun, Gunma-ken; Toshitake Nagai, Ojimamachi, all of Japan

[73] Assignees: Miura Dolphins Co., Ltd.; Tonen Corporation, both of Tokyo; Osaka Organic Chemical Industry Co., Ltd., Osaka; Tonen Chemical Corp., Tokyo; Sanyo Electric Co., Ltd., Moriguchi; Masahisa Ohtsuka, Ohizumimachi, all of Japan

[*] Notice: The portion of the term of this patent subsequent to Aug. 11, 2009 has been disclaimed.

[21] Appl. No.: 648,186

[22] Filed: Jan. 31, 1991

[30] Foreign Application Priority Data

| Feb. 2, 1990 | [JP] | Japan | 2-24069 |
| Jun. 9, 1990 | [JP] | Japan | 2-150729 |
| Jun. 9, 1990 | [JP] | Japan | 2-150730 |
| Aug. 14, 1990 | [JP] | Japan | 2-214697 |

[51] Int. Cl.⁵ .................................................. F25C 3/00
[52] U.S. Cl. ........................................ 428/15; 62/74; 428/403; 428/407
[58] Field of Search .................. 428/15, 403, 407; 62/74

[56] References Cited

U.S. PATENT DOCUMENTS

| 3,022,270 | 2/1962 | Proffitt | 526/228 |
| 3,022,280 | 2/1962 | Shukys | 526/221 |
| 3,247,171 | 4/1966 | Walker et al. | 526/287 X |
| 3,596,476 | 8/1971 | Achmuhle et al. | 62/121 X |
| 4,200,228 | 4/1980 | Woerpel | 239/2.2 |
| 4,714,087 | 12/1987 | Jones | 137/98 X |
| 4,742,958 | 5/1988 | Bucceri | 62/74 X |
| 4,793,142 | 12/1988 | Bucceri | 62/74 |
| 5,073,612 | 12/1991 | Irie et al. | 526/241 X |
| 5,136,849 | 8/1992 | Miura et al. | 62/74 X |

Primary Examiner—Henry F. Epstein
Attorney, Agent, or Firm—Ostrolenk, Faber, Gerb & Soffen

[57] ABSTRACT

Artificial snow granule in granule form comprising a super absorbent polymer in granule form as a nucleus and an ice layer surrounding the nucleus is provided here.

Artificial snow granule in an aggregate form of snow granule granules comprising super absorbent polymer in granule form as nucleus and ice layers surrounded the nucleus wherein said aggregate form is caused by a linkage of the adjacent ice layers and/or granules.

Further, a snow granule quality improver is provided.

A method for making the above-mentioned snow granule in granule or an aggregate form is also provided here.

7 Claims, 3 Drawing Sheets

ARTIFICIAL SNOW GRANULE

BACKGROUND OF THE INVENTION

(1) Field of the Invention

The present invention relates to artificial snow in a granule or an aggregate form and a novel method for making the same, and more particularly to artificial snow in a granule or in an aggregate form suitable for skiing, both of which have a particle structure similar to that of compact natural snow in granule form and a method for making the same. The method of the present invention comprises absorbing water into a super absorbent polymer in granule form which can retain the granule form after absorption of water without sticking each other, and freezing the water-swollen super absorbent polymer.

Further, the present invention relates to a snow quality improver to control snow conditions freely so as to give artificial snow suitable for skiing by blending it with natural snow, artificial snow made by a snow machine or icy snow made by shattering ice blocks to fragments.

(2) Description of the Prior Art

Natural snow

In the recent years, there have been marked decreases in snowfall and accumulation and as a result, considerable hindrance of the opening of many ski areas has been occasioned. Furthermore, it is necessary to pack the snow on a slope by tracksetter several times in order to prepare a well-groomed packed slope for sliding on skis because newly fallen natural snow is too soft and is not suitable for smooth sliding on skis. On the other hand, the snow conditions of a tracksetter-groomed trail is not suitable for a ski racing competition and the trail has to be groomed by a method comprising of treading the slope underfoot, then spraying water on spread snow, and the like.

The snow conditions of runs prepared by such methods are very susceptible to influences from the outside air temperature, and change from compact snow into corn snow with the passage of time. Said change is caused by the fact that sublimation and condensation of water molecules of snow cause a change in snow granules.

It is not easy for skiers to slide smoothly on skis on a slope covered by corn snow, and thus frequent grooming, for example, breaking the crust snow is indispensable. These attempts, however, still gave poor simulation of natural snow conditions.

Artificial snow

In recent years, installation of snow machines has become popular in many ski areas to prolong the overall skiing season. Conventional snow machines fall into two groups consisting mainly of "gun" type or "fan" type machine.

A method for making artificial snow by use of those snow machines comprises atomizing compressed water into a subzero atmosphere to make fine ice particles with the aid of adiabatic expansion of compressed air or cooling air. The artificial snow thus produced contains 10% by weight or more of water, and has a density of about 0.3 to about 0.4 g/cm$^3$ with a mechanical strength of less than about 1 kg/cm$^2$. The slope covered by such artificial snow is still not skiable without being packed. Such artificial snow changes its quality more quickly than natural snow and in certain cases, forms corn snow having an average outer diameter of about 1 to 5 mm in a few days. As mentioned above, corn snow is troublesome to skiers and hence a measure similar to the aforesaid is required to resolve the situation.

The methods for producing artificial snow and apparatus are disclosed in U.S. Pat. Nos. 3,716,190; 3,010,660; 3,301,485; 3,298,612; 3,761,020; 3,774,843; 3,774,842; 3,945,567; 4,004,732; 4,083,492; 4,105,161; 3,733,029; Australian Patent Applications Nos. 77956/75 and 12534/83.

Other art references disclose methods comprising supplying water-particles into the a current of air from a fan (U.S. Pat. Nos. 3,760,598; 2,968,164), freezing the particles with the addition of ice crystals (U.S. Pat. No. 3,596,476) or bacteria (U.S. Pat. No. 4,200,228) as a nucleus to accelerate the formation of snow flakes or snow crystals.

International Application PCT/AU86/00158(International Publication WO86/07373) discloses a method for making artificial snow which comprises mixing water with an absorbent material which swells upon absorbing water, and exposing thereafter the resulting water-swollen material to the air followed by freezing. The snow produced thereby has a density of about 0.4 to 0.9 g/cm$^3$ with a mechanical strength of about 10 to several 100 kg/cm$^2$. These ranges show that density and mechanical strength of the snow vary widely depending on the conditions of snow being exposed and frozen. Such product has a stiff, fine ice form, i.e. an "Eisbahn" in quality, rather than snow. Therefore, when artificial snow suitable for use to cover ski slopes is made from the water-swellable material alone, addition of a surfactant, regulation of particle sizes and water content, and frequent grooming of slopes are necessary to prevent an excessive agglomeration of frozen particles. Such snow is rated among the most difficult snow to handle for ski hill operators. U.S. Pat. Nos. 3,247,171; 3,022,279; 3,022,280; 3,251,194; GB Patent Application No. 2127005; and Australian Patent No. 464077 disclose the aforesaid absorbent materials.

As snow conditions on ski slopes are susceptible to influences from the weather, indoor artificial skiing slopes have become popular in recent years. A snow cover for the indoor ski slopes is also made by use of the above-mentioned artificial snow, artificial ice granules, snow fragments or artificial snow made from a water absorbent material which swells upon absorbing water with which the indoor slope is covered or coated. In this instance, the aforesaid problems still remain unsolved. Another indoor ski slope is constuted by a method comprising covering the slope with a material in paste form which is a mixture of a absorbent polymer with water(blending ratio=about 1/80 to about 1/100), freezing the cover throughout the slope, and subsequently grooming the frozen cover surface by scraping off so as to make artificial snow. In addition to the aforesaid problems, such slope has an inherent problem that pole planting is not so easy in this type of snow, because there is an ice layer like "Eisbahn" underneath the artificial snow.

Comparison of a granule structure of natural snow with artificial snow

Natural fresh snow fallen on ski slopes contains over 90% by volume of a void space and is not suitable for skiing. Such fresh snow compacted by itself or groomed by a tracksetter is the most appropriate snow for skiing.

Accordingly, the microscope photographs of fresh, compact and artificial snow were compared one another.

Photograph No. 1 showing granules like stars is a microscope photograph of a structure of natural fresh snow in which several parts of the six branches of a snow crystal are narrow so as to form small ice beads, some of the adjacent two beads aggregating together to form a bottle gourd.

Photograph No. 2 is a microscope photograph of a structure of natural compact snow which shows no snow granules like stars any more but many bottle gourds formed by aggregation of most of the adjacent two ice beads so as to provide a snow aggregate. It is observed that there is still void space in a relatively small amount but it distributes uniformly all over among the ice phases of these bottle gourds.

Photograph No. 3 is a microscope photograph of a structure of aforesaid artificial snow in which frozen water-swollen polymer granules (black regions) and ice constitute a harmonious whole and the polymer graneles can not be distinguished from the ice phase in which water-swollen polymer granules themselves in bare state appear on the surfaces of snow granules and most of the void spaces are unevenly distributed to form large voids (white regions). This type of snow structure has no ice beads and bottle gourds which z exist in the snow structure of compact natural snow.

Photograph No. 4 and 5 are microscope photographs of structures of artificial snow made by freezing conventional absorbent polymers after absorption of water. Photograph No. 4 shows the structure of a conventional water-swollen polymer frozen in the original granule form in a similar way shown in Photograph No. 3. Photograph No. 5 shows a structure of an another conventional water-swollen polymer in granule form (spherical regions) frozen in the original swollen form and it seems to have a somewhat different structure from that of the snow shown in Photograph No. 3, but in fact there are many scars (black dendritic regions) on the surface of the polymer granule caused by breaking of the ice surrounding the polymer granule and the bare surfaces of the polymer uncovered with ice appear on the surfaces of snow granules. There is little void space in the structure and structure is also entirely different from that one of compact natural snow.

Such artificial snow having structures shown in photographs Nos. 3 to 5 gave poor suitability for sliding on skis in on-the-spot evaluation. The estimated reasons why these structures of artificial snow give poor results are summarized as follows:

(a) Such artificial snow having entirely different structures from that one of packed natural snow may provide only rough and fine icy snow, corn snow or snow like "Eisbahn" wherein frozen polymer and ice constitute a harmonious whole and most of the small void spaces are unevenly distributed so as to give a large void space, or said structure includes little void space and broken polymer granules or granules themselves in bare appearing state on the surfaces of snow granules.

(b) When the absorbent polymer granules in bare state appear on the surfaces of snow granules, friction may increase as a result of direct contact of soles of skis with the absorbent polymer.

Because of this, artificial snow in granule or aggregate form having the structure similar to that of compact snow shown in Photograph No. 2 may provide good snow quality for skiing.

Some of the problems associated with natural snow or artificial snow used to cover ski slopes include the following.

(a) Packing procedures are indispensable to prepare well-groomed trails for skiing.

(b) It is not easy to make snow having a desired density and strength, i.e. it is difficult to freely adjust the snow conditions to the one that matches skier's abilities, performances or preferences.

(c) Snow conditions vary widely with the passage of time. Therefore, it is difficult to maintain the snow quality in good conditions on ski slopes for a relatively long time period.

(d) Investment and maintenance costs for artificial slope are too expensive.

(e) Artificial snow produced by freezing water and a water-swollable material forms an ice block. Therefore, the process for crushing the ice block is essential.

SUMMARY OF THE INVENTION

The inventors have found that the novel method of the present invention can produce artificial snow in granule form or an aggregate form of snow granules having a structure similar to that of compact snow in which said method comprises absorbing water into a super absorbent polymer which can retain its granule form after absorption of water without sticking to each other, and freezing the water-swollen polymer. Moreover, they have found that when a snow quality improver of the present invention is blended with natural, artificial or icy snow, snow conditions may be improved freely so as to give artificial snow suitable for skiing.

It is accordingly an object of the present invention to provide artificial snow in granule form.

It is another object of the invention to provide artificial snow in an aggregate form of snow granules.

It is a further object of the invention to provide a snow quality improver.

It is another object of the invention to provide a method for making snow in granule or an aggregate form of snow granules.

An aspect of this invention is artificial snow in granule form comprising a super absorbent polymer in granule form as a nucleus and an ice layer surrounding the necleus.

Another aspect of this invention is artificial snow in an aggregate form of snow granules comprising a super absorbent polymer as nuclei and ice layers surrounding the nuclei in which said aggregation is caused by the linkage of the adjacent two ice layers and/or two snow granules.

A further aspect of this invention is a snow quality improver comprising a super absorbent polymer in granule form in which said absorbent polymer has the following characteristics comprising:

(a) said polymer can retain its original granule form after absorption of water without sticking each other;

(b) said polymer has a deionized-water absorbability of about 30 to 500 times the weight of the dry polymer;

(c) said polymer has an average particle size of about 20 to 500 $\mu m$ before water absorption; and (d) said polymer has an average particle size of about 0.05 to 5 mm after water absorption.

Another aspect of this invention is a method for making artificial snow in an aggregate form of snow granules having an average particle size of about 0.05 to 5 mm which comprises the steps of:

(a) absorbing water into a super absorbent polymer in granule form which can retain its granule form after absorption of water without sticking to each other, and has a deionized-water absorbability of about 30 to 500 times the weight of the dry polymer, an average particle size of about 20 to 500 μm before water absorption so as to give a water-swollen polymer having an average particle size of about 0.05 to 5 mm; and (b) freezing the water-swollen super absorbent polymer by mixing it with a coolant.

BRIEF DESCRIPTION OF THE PHOTOGRAPHS

Photograph No. 1 is the microscopic photograph showing the structure of fresh natural snow in granule form.

Photograph No. 2 is the microscopic photograph showing the structure of compact natural snow.

Photograph No. 3 is the microscopic photograph showing the structure of artificial snow made by use of a water-swell-able polymer.

Photograph No. 4 is the microscopic photograph showing the structure of artificial snow made by use of a conventional absorbent polymer.

Photograph No. 5 is the microscopic photograph showing the structure of artificial snow made by use of an another conventional absorbent polymer.

Photograph No. 6 is the microscopic photograph showing the structure of artificial snow of the present invention in granule form and an aggregate form of snow granules made by use of a super absorbent polymer of the invention.

DETAILED DESCRIPTION OF THE INVENTION

Figure 1:
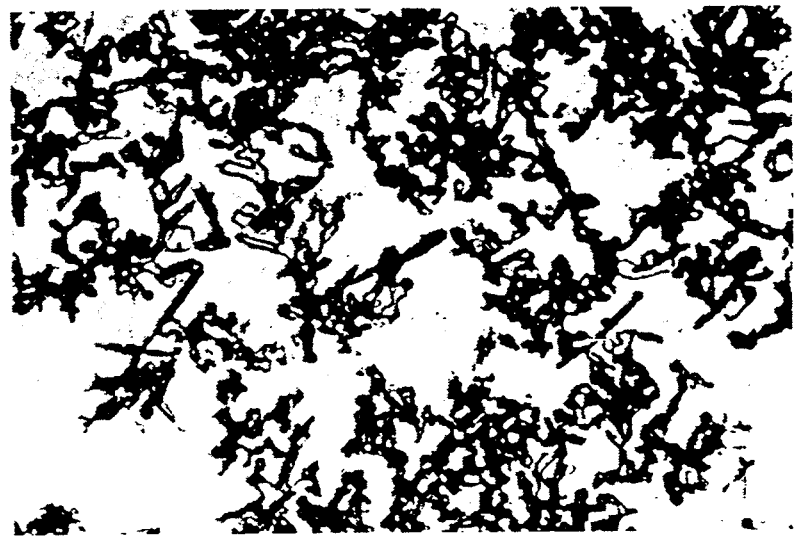
Figure 2:
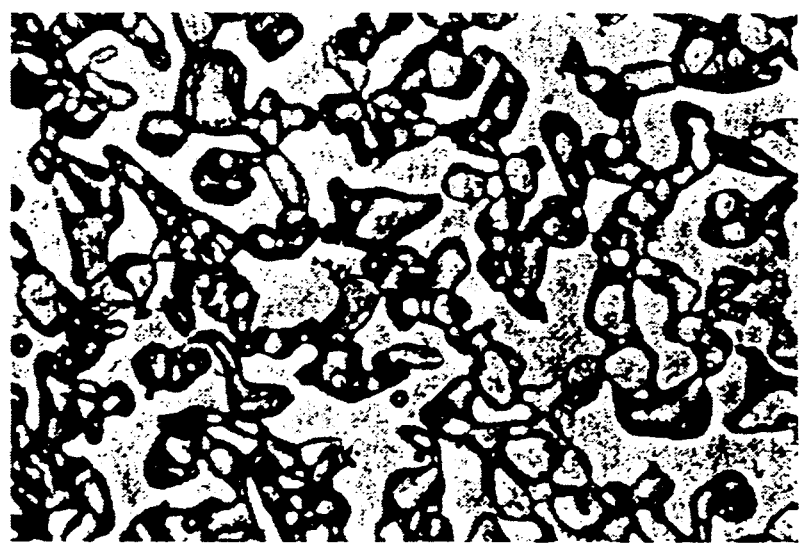
Figure 3:
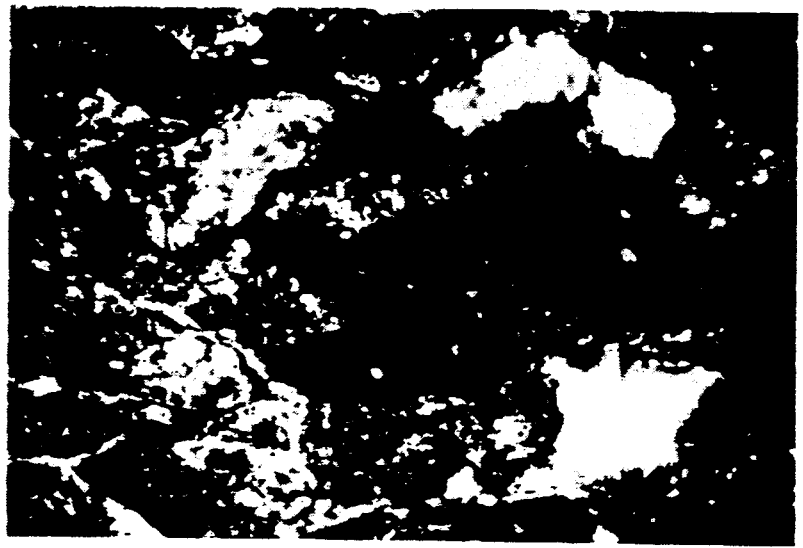
Figure 4:
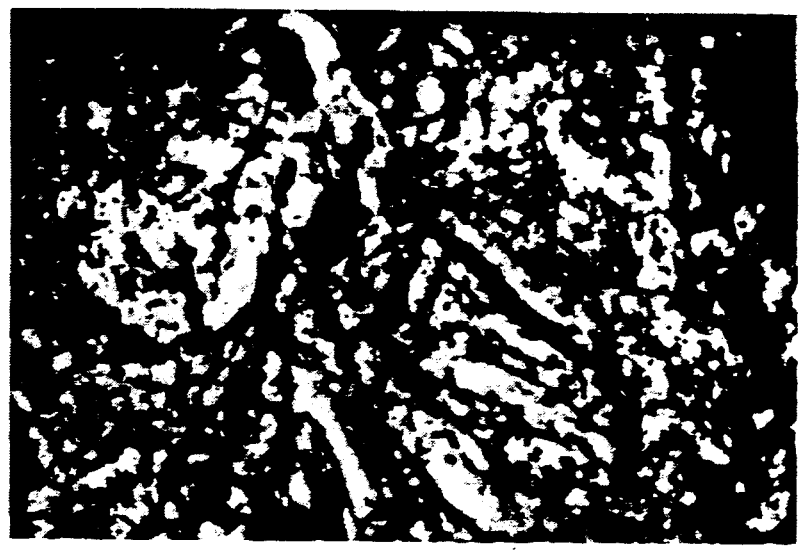
Figure 5:
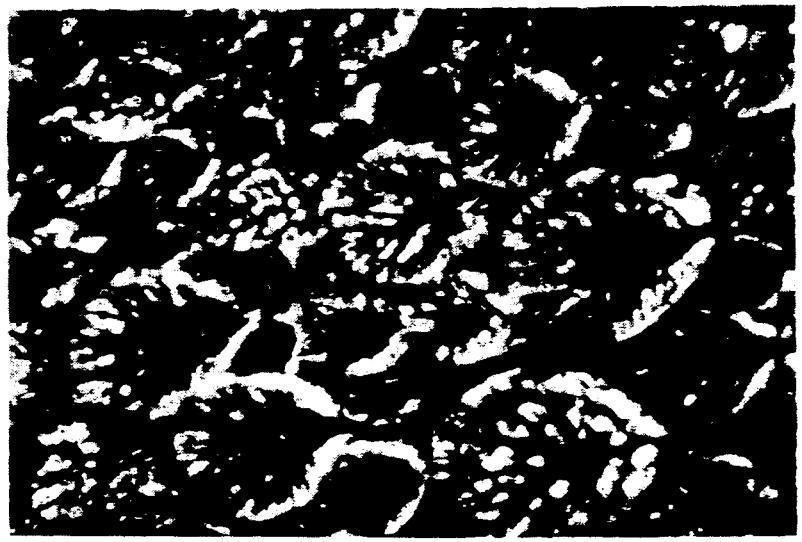
Figure 6:
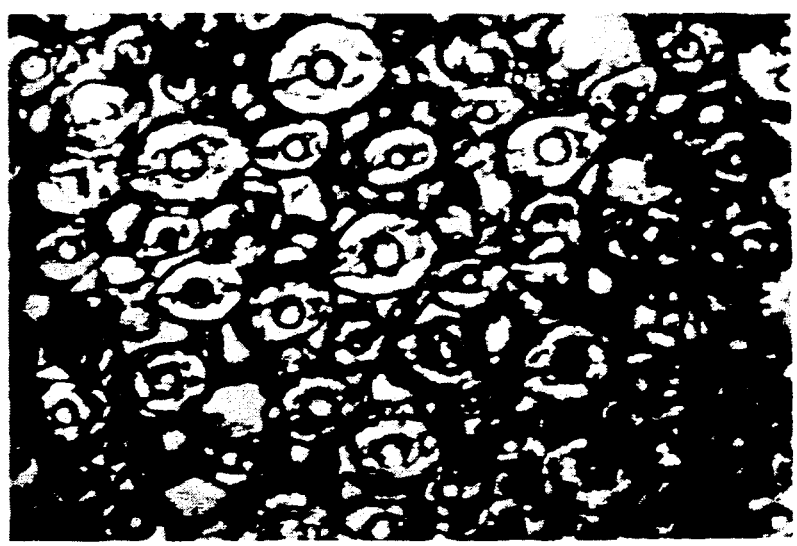

Artificial snow in granule form or an aggregate form of snow granules of the present invention may be produced by a method comprising absorbing water into a super absorbent polymer in granule form to swell the polymer with water, freezing the resulting water-swollen polymer by mixing it with a coolant such as liquid nitrogen, dry ice or liquid carbon dioxide, or by cooling by placing it in a layer on a substrate cooled below −5° C. in a refrigerator.

The inventors of the present invention have found the following facts. When a water-swollen super absorbent polymer in granule form of the present invention is frozen without being exposed to the air in advance, the water absorbed is oozed out of the surface of the granule without breakage of the granule, and at the same time the volume of the granule is decreased. Upon proceeding the freezing process, an ice layer surrounding the surface of the granule acts as a nucleus like an ice bead, around which the artificial snow granule forms. Then, two of the adjacent beads link together through the ice phase to form bottle gourds distributed homogeneously all over the snow structure and as a result, artificial snow in an aggregate form of snow granules is provided. At the time, void spaces are distributed homogeneously among the bottle gourds is formed. Such artificial snow in granule or an aggregate form of snow granules has a structure similar to that of compact natural snow and has been found to be suitable for use to cover indoor ski slopes in good conditions for sliding on skis (Photograph No. 6).

Although the reasons why the artificial snow similar to compact natural snow is obtained in the present invention have not been necessarily known in detail, it is supposed that artificial snow in granule or an aggregate form of snow granules may be produced without any air-exposure steps before freezing, because in the present process fine void spaces distribute automatically and homogeneously all over the structure of the snow aggregate in the course of formation of said aggregate. Of course, it is to be understood that the aforesaid process of the present invention is intended in an illustrative rather than in a limiting sense.

Photograph No. 6 is the microscopic photograph of a structure of artificial snow of the present invention in x granule and aggregate forms. The photograph shows artificial snow in ice-granule form made by complete cover of the surface of a super absorbent polymer in granule form with an ice layer, and also artificial snow in an aggregate form of snow granules in which there is a void space distributed uniformly among bottle gourds formed by aggregation of most of the adjacent ice-granules through the ice phase. In accordance with field testing, such artificial snow in granule or an aggregate form of snow granules have been found to be most suitable for use to cover indoor ski slopes to give good conditions for sliding on skis.

A super absorbent polymer in granule form used for making artificial snow in granule or an aggregate form includes starch, cellulose, a polymer, a copolymer or a terpolymer of acrylic acid, acrylic acid salt, methacrylic acid salt, styrene, vinyl ether and the like. Of these (co)polymers, a polyacrylic acid salt produced by means of a reverse-phase suspension polymerization in an organic solvent, a vinylalcohol-acrylic acid salt copolymer or a partially saponified isobutylene-maleic anhydride copolymer are most appropriate.

These preferred polymers or copolymers are obtained in a spherical form.

The preferable particle size of the super absorbent polymer of the present invention is in a range of about 0.05 mm to 5 mm after water absorption, with a range of about 20 to 500 μm before water absorption. When the particle size is less than about 20 μm before absorption of water, hard snow is obtained because the particles are too fine. When the particle size is more than about 500 μm, artificial snow in corn state is obtained which is unpreferable.

Further, in the present invention a super absorbent polymer in granule form which can retain its original granule form and its flowability even after water absorption without becoming sticky is preferable. An absorbent polymer is also known in the market which becomes sticky and pasty when it absorbs water. Such a paste forms a large block of ice when it is frozen, which such block can not provide a good snow for ski slopes unless it is aftertreated. The structure of such snow granules is similar to that shown in Photographs 3 and 4.

In order to keep its granule form and good fluidability of the dried polymer even after water absorption, it is necessary to increase the degree of cure of the polymer by reacting the polymer with a multi-epoxy or multi-amine group-containing curing agent to such an extent that the water absorbability of the polymer matches the above-mentioned range. When the degree of cure is too high, the water absorbability of the polymer decreases unpreferably.

Deionized water absorbability of the present polymer is in a range of about 30 to 500 times the weight of the dry polymer, preferably about 50 to 200 times the weight of the dry polymer used. When the water absorbability is less than about 30 times, the amount of the polymer to be blended is increased uneconomically, and when the water absorbability is more than about 500 times, the gel-strength after water absorption is impaired, and fragility of the water swollen polymers against pressure is increased unpreferably.

In the present super polymer, the amount of water to be absorbed is up to its maximum water absorbability, specifically it is about 50 to 100 times the weight of the dry polymer, which is expressed here by a water absorption ratio.

When a soft aggregate of snow granules is desired, a water absorption ratio of about 5 to 50 times the weight of the polymer is appropriate, and when a hard aggregate of snow granules is desired a water absorption ratio of about 30 to 100 times the weight of the dry polymer is preferable.

In the present polymer, the water absorption ratio should be less than the maximum water absorbability of the polymer, and thus in this way the frozen polymer in granule form still has water absorbability. Therefore, the artificial snow can further absorb liquid phase water formed by melting snow under the influence of atmospheric temperature, with the result that the ski slope can be retained in its original good snow conditions for skiing for a relatively long time period.

However, even when water in an amount exceeding its maximum water absorbability is absorbed by said super absorbent polymer, the water absorbed is oozed out of the polymer granule upon freezing the swollen polymer and an ice layer surrounding completely the surface of the granule forms as a nucleus. The artificial snow thus formed in granule or an aggregate form can further absorb water produced by melting of snow. In this case, the amount of water absorbed by the polymer is about 100 to 120% by weight, preferably about 100 to 110% by weight of its maximum water absorbability. When water in an amount of over 120% is absorbed, artificial snow in aggregate form made by freezing said water-swollen polymer has less void space and forms hard and rough snow which is unpreferable. For example, when hard and heavy snow is desired, about 20 to 150 $\mu m$ of a relatively small average size of the dried polymer, and about 30 to 80 of a relatively higher ratio of (water absorbed)/(water absorbability of the dried polymer) are used preferably. On the contrary, when a soft aggregate of snow granules is desired, about 150 to 500 $\mu m$ of a large average size of the dried polymer, and about 10 to 50 of a relatively lower ratio of (water absorbed)/(water absorbability of the dried polymer) are used preferably.

Artificial snow of the present invention has a density of about 0.3 to 0.8 $g/cm^3$, and a mechanical strength of about 1 to 20 $kg/cm^2$. The most preferable strength of snow is about 1 $kg/cm^2$ for beginners, and it reaches a strength of about 10 $kg/cm^2$ for experts on the order of an international skiing racer. These ranges are included in the present invention, and artificial snow having these ranges may be produced freely by the method of the present invention. Any densities or strengths may be possible, if necessary.

Any method for absorbing water into an absorbent polymer may be acceptable. For example, a simple method consisting of feeding the polymer in granule form into water with stirring followed by allowing the mixture to stand for several minutes depending on the desired amount of water to be absorbed.

As the water-swollen polymer can keep water initially absorbed without any water release for a long period of time being allowing to stand, there is no adverse effect on the water swollen polymer if there is plenty of time (for example, over about 2 months) before it is frozen. In freezing a water-swollen polymer, any method such as a manual control device or a machine controlled operation system may be acceptable. Among them, the method for making a snow cover in a plate state which can cover or easily coat indoor ski slopes is recommended wherein said method comprises:

covering or filling up a sheet, plate, wave plate or woven cloth, or a case, panel or box made of plastics, metals or metal-alloys such as aluminium, ceramics, concrete with artificial snow, and then freezing the snow in a layer to give a snow cover product in a plate state. Therefore, it is convenient to cover or coat an indoor slope or plain with said snow cover products in a form which suit the irregularity of the surface of the slope.

In order to unite or adhere the adjacent snow cover products to each other, any process of making the two covers so as to engage together, any after-processing of the snow covers to make them suitable for covering slopes smoothly, or any chemical or mechanical devices to be attached may be acceptable in the manufacturing stages.

Materials for making a ski slope and/or flat base for artificial snow are not limited to earths, concrete, metals, woods, plastics, ceramics and the like. Refrigerating or cooling system may be equipped with thermal insulators. When the indoor skiing is maintained in good conditions for a long term, it is recommended to install a thermal insulating, cooling or refrigerating system.

To prevent slipping of the snow cover on the surface of slope, any mechanical or chemical devices may be acceptable.

In one preferable embodiment, a method of the present invention comprises:

covering an indoor snow ski slope with the hard artificial snow covers of the present invention as a continuous snow cover; and coating said snow covers in an appropriate depth with powdery artificial snow of the present invention.

By using said method, an indoor slope having good conditions for skiing can be made with no problems aforesaid including the difficulty of sticking poles into the snow. Such ski slopes created by this method are equivalent to natural ski slopes in skiing or sliding performance.

Regeneration of a super absorbent polymer of the present invention may be possible, if necessary, in which the regeneration process includes the step of separation of snow, water and soils from the polymer followed by drying the recovered polymer for reuse. It is environmentally safe to dispose the old polymer because the super polymer itself is light-degradable and biodegradable. However, if early degradation of the waste particles is desired, an addition, blending, impregnation or coating of a chemical selected from the group consisting of accerelators, catalysts, or additives for promoting light degradation or biodegradation of the particles may be effective for that purpose.

As the polymer particles are free from danger to human health, it is also preferable to select chemicals for the purpose of taking safety into consideration.

Artificial snow in granule or an aggregate form of the present invention may be mono- and/or multi-colored with known pigments or dyestuffs. The colored snow looks beautiful, and a commercial value may be added to the artificial snow. For example, each slope for beginners, experts or intermediate skiers may be covered by a different colored artificial snow to add more fun.

In the present artificial snow in granule or an aggregate form as well as a super absorbent polymer of the present invention, various additives can be used, in so far as they do not deviate from the gist of the present invention. Examples of such additives include perfumes, odorants, and aromas to give odor. Further, other additives such as antioxidants, ultraviolet absorbers, fluorescent additives, bacteria to accelerate the formation of snow crystals, nuclei, extending agents, friction improvers, and the like may be added, blended, coated or impregnated to a super absorbent polymer of the invention.

Any known method may be used for freezing the water-swollen absorbent polymer of the invention. Examples of such usable methods include a method comprising mixing the polymer with dried ice, liquid nitrogen, liquid air, or liquid carbon dioxide followed by freezing the resulting mixture, a method comprising freezing the polymer placed on metal pipes or sheets cooled by use of a cooling medium, a method comprising freezing the polymer in a refrigerator, and a method comprising making snow by use of a snow machine or a machine for producing snow. The most preferred method is adopted depending on the use of the snow obtained.

The method for producing snow in granule form or powder snow is different from the method for producing snow in an aggregate form.

When snow in granule form or powder snow is desirable, the method comprising directly mixing a water-swollen polymer with dried ice, liquid nitrogen, liquid air, or liquid carbon dioxide followed by rapid freezing of the resulting mixture is preferable rather than the method comprising making snow by using a snow machine or a machine for producing snow. A more preferable method comprises mixing directly a water-swollen polymer with powdery or crushed dried ice. Any amount of these coolants and any length of time may be acceptable. Preferable temperature of snow produced is within the range of about 0° to −30° C. depending on the purpose of the use of snow. It is preferable to proceed rapidly and homogeneously freezing process because the mixing state varies with the size of dried ice or mixing velocity.

The method comprising freezing the polymer by use of liquid nitrogen, liquid air, liquid carbon dioxide or equivalent as a coolant may be useful because such coolant in liquid phase can be mixed easily with a water-swollen absorbent polymer with the result that said water-swollen absorbent polymer may be frozen rapidly and effectively with the aid of the latent heat of these coolants. Although other similar liquid phase coolants may be also acceptable, the abovementioned liquid phase coolant or coolants are more preferable and practical because of excellent cooling capability, inexpensiveness, availability, and simple handling thereof.

In one of preferred embodiments of the invention, a method comprises:

absorbing water into a super absorbent polymer in granule form having particle sizes of about 20 to 500 $\mu$m before water absorption and a deionized-water absorbability of 30 to 500 times the weight of the dry polymer and a non-adhering property after absorption of water without losing its original granular form after water absorption, swelling the polymer until the polymer granule having an average particle size of about 0.05 to 5 mm is obtained, combining (with or without mixing) the water-swollen polymer with natural snow, artificial snow made by use of a snow machine or icy snow made by bursting ice blocks into fragments, followed by freezing the resulting mixture by mixing it with liquid carbon dioxide.

Conventional liquid phase carbon dioxide may be acceptable. Carbon dioxide has a latent heat of evaporation of 5.1 Kcal./kg at 30° C., 48.1 Kcal./kg at 10° C., 56.1 kcal./kg at 0° C. and hence may be used for cooling and effectively freezing a water-swollen super absorbent polymer of the invention.

Liquid carbon dioxide is obtained by liquefaction of vapor phase carbon dioxide at a pressure of about 40 atm. Resources of carbon dioxide are off-gases from liquefied natural gas, ammonium, petroleum refining or ethylene production facilities. Other off-gases or tail gases evolved in petrochemical plants or steel works may be used as the source.

The method for making snow in an aggregate form of snow granules comprises absorbing water into a super absorbent polymer in granule form having a particle size of about 20 to 500 $\mu$m before water absorption and a deionized-water absorbability of 30 to 500 times the weight of the dry polymer, and a non-adhering property after absorption of water without losing its original granular form, swelling the polymer until the polymer granules having an average particle size of about 0.05 to 5 mm is obtained, combining (with or without mixing) the water-swollen polymer with snow selected from the group consisting of natural snow, artificial snow made by use of a snow machine, icy snow made by crushing ice blocks, and/or with dried ice, followed by freezing the resulting mixture.

In another embodiment, a method for making snow cover products is provided which comprises freezing water-swollen super absorbent polymer placed in a layer on a substrate such as pipe, sheet or plate by using a coolant at a temperature of below about −40° C. A lower temperature range gives harder snow.

Further in another embodiment of the present invention, a method is provided which comprises freezing a water-swollen super absorbent polymer in a layer having a thickness of under 6 cm in a refrigerator cooled at a temperature of about −5° to −30° C.

Artificial snow made by freezing a water-swollen absorbent polymer or a mixture of said polymer with natural snow or dried ice in a layer having a thickness of over about 6 mm in a refrigerator at a temperature of −5° to −30° C. does not have an aggregate form of snow articles but has an ice block form like "Eisbahn" which is not suitable for use to cover artificial ski slopes as well as for use as an artificial continuous snow cover on indoor ski slopes without pre-treatment before use.

Judging from the fact that the upper part of the layer contains snow in aggregate form in some extent but lower part thereof is formed mainly from ice block, said ice block like "Eisbahn" seems to be formed by action of the gravitation. Therefore, when freezing a mixture of the water-swollen polymer with natural snow or dried ice in a layer, the thickness of said layer is no more than 6 cm, preferably about 2 to 4 cm.

Any method for freezing a water-swollen super absorbent polymer in a layer to make snow cover products is acceptable in the invention. Examples of such method include manual or automatic operation by use of a machine. However, a method comprising freezing the artificial snow in an aggregate form of the invention in a layer on or in a sheet, wave or corrugated sheet, woven fabric, case, panel, box or the equivalent made of plastics, metals or metal alloys such as aluminum, ceramics, concrete, cement, and wood is preferred so as to provide snow cover products in a plate state suitable for use to cover indoor ski slopes.

Any refrigeration facilities having a refrigeration capacity may be acceptable which are capable of having water-swollen polymer placed in a layer at a temperature of about $-5°$ to $-30°$ C. Examples of such facilities include a mobile refrigerator trailer (van), a fixed refrigerator and the like.

Any known method for mixing the water-swollen super absorbent polymer in granule form with natural snow and/or dried ice may be used. The blend ratio in weight of the polymer to snow is in a range of 99:1 to 50:50, preferably 99:2 to 70:30 depending on the use being proposed. Powdered or crushed dried ice may be preferred as a coolant.

Further, the present invention provides a snow quality improver which is able to improve snow conditions freely so as to give snow most suitable for skiing by blending said improver with natural snow, artificial snow or icy snow.

The snow quality improver of the invention comprises a super absorbent polymer having a non-sticky properties after water absorption without sticking to each other, a deionized water absorbability of about 30 to 500 times the weight of the dry polymer, a particle size of about 20 to 500 $\mu$m and a particle size of about 0.05 to 5 mm after water absorption.

A water-swollen polymer having water in advance 5 to 100 times the weight of the dried polymer may be preferable, providing the water content is not necessarily limited to the range.

The reasons why a snow quality improver in granule form is preferred are as follows:

(a) easy to blend with snow homogeneously;

(b) "ice bridges" among snow granules produced are dispersed homogeneously and not too hard; and (c) exposed polymer granules on the snow surface have not an adverse effect on good sliding on skis because said polymer granules have a spherical form.

The preferable particle size of said snow quality improver of the invention is in a range of about 0.05 mm to 5 mm after water absorption, and with a range of about 20 to about 500 $\mu$m before water absorption to give a homogeneous mixture with snow. When the particle size is under about 20 $\mu$m, it is difficult to obtain a homogeneous mixture with snow, because the particles are too fine. On the contrary, if the particle size is more than about 500 $\mu$m, larger particles are mixed with snow in an isolated state unpreferably.

Deionized-water absorbability of said snow quality improver is in a range of about 30 to 500 times, preferably about 50 to about 200 times the weight of the dry polymer used. When the water absorbability is under about 30 times, the amount of the improver to be blended is increased uneconomically, and when the water absorbability is over 500 times, the gel-strength after water absorption is impaired, and fragility of the water-swollen improver against pressure is increased unpreferably.

A preferable blending ratio of the present snow quality improver to 100 parts by weight of natural snow, artificial snow made by a snow machine or icy snow made by bursting or crushing ice blocks is about 0.1 to 10.0 parts by weight.

To obtain artificial snow having a desired density or strength, about 0.1 to 10.0 parts by weight of the present snow quality improver in dried state are blended with 100 parts by weight of snow so as to absorb water in an amount of about 5 to 100 times the weight of the dried improver within the upper limits of about 200 parts by weight of the water-swollen improver.

It is observed under a microscope that when the artificial snow containing a snow quality improver in granule form of the invention is frozen by a latent heat of the snow and cooling air, water inside the granules is oozed out of the water swollen granules and frozen on the surfaces of granules so as to form "ice bridges" among snow granules.

The inventors have found that when the amount of water oozed out of the water-swollen granules is properly controlled, i.e. when the number of "ice bridges" is adjusted, artificial snow having a desired density or strength is obtained. That is, by varying parameters such as an average particle size of improver, the ratio of (water absorbed)/(water (water absorbability of the improver), and parts by weight of the water-swollen snow quality improver and the like, the amount of water oozed out of the granules may be controlled with a result that artificial snow having any desired density or strength may be obtained.

For example, when hard and heavy snow is desired, about 20 to 150 $\mu$m of a relatively smaller average particle size of the improver in granule form about 30 to 80 of relatively higher ratio of(water absorbed)/(water absorbability of the improver), and about 30 to 200 parts by weight of a relatively higher amount of water-swollen granules are used preferably. On the contrary, when a soft aggregate of snow granules is desired, about 150 to 500 $\mu$m of a large average particles size of the improver in granule form about 10 to 50 of a relatively lower ratio of (water absorbed)/(water absorbability of the improver), and about 10 to 80 parts by weight of a relatively lower amount of water-swollen granules are used preferably.

Further, it has now been found that in order to retain the original snow quality for a longer term, the water absorption ratio should be less than the water absorbability of the dried improver or enhancer, in which case, the water-swollen improver or enhancer granules still have some water absorbability. Therefore, they can further absorb liquid phase water formed by melting snow under the influence of atmospheric temperature, with the result that the ski slope can retain its original good conditions for skiing through a relatively longer term.

In general, the snow newly prepared by use of a snow machine is a mixture of about 60 to 90% by weight of ice particles with about 40 to 10% of liquid phase water. Such wet snow is troublesome for beginners or intermediate skiers to slide on skis. When a snow quality improver of the present invention in granule form is blended with such snow, the wet snow changes itself into dry powder snow more suitable for sliding on skis for beginners or intermediate skiers.

In an early spring or a warmer sunny day in a winter, for example, when snow becomes so-called wet snow containing liquid phase water, such degradation of snow (wet snow) can be prevented effectively by blending said snow quality improver in granule form of the present invention with said wet snow.

An amount of a snow quality improver to 100 parts of snow is in a range of about 0.1 to 10.0 parts by weight, preferably in a range of about 1.0 to about 10.0 parts by weight for remarkably wet snow, whereas a preferable range for slightly wet snow is about 0.1 to 1.0 parts by weight.

Any known methods for mixing the snow improver of the invention with snow may be applied. Among them, a method has been provided wherein the snow quality improver contained in a vessel equipped with a spreading or distributing means underneath carried on a maintenance truck and the like are spread over skiing area or ski slopes through a nozzle means attached to said device, and mixed with snow during maintenance operation for ski area or ski slopes. In such method, both natural snow and artificial snow may be used.

A gun-type or fan-type snow machine equipped with means capable of spreading or distributing over said snow quality improver in granule form by the aid of compressed air can be used in which the granules are spread simultaneously with spreading artificial snow.

Another blending method comprises the step of mixing said improver in granule form transferred by the aid of air flow to a snow machine with hot or cold water, and then spreading the water-swollen granules into the air by using compressed air simultaneously with spreading of artificial snow made by the snow machine to give a snow mixture.

Regeneration of said snow quality improver of the present invention may be possible, if necessary, in which the regeneration process includes a step of separation of snow, water and soils from the improver followed by drying the recovered polymer for reuse. It is environmentally safe to dispose the used improver because the improver itself is light-degradable and biodegradable. However, if early degradation of the waste granules is desirable, an addition, blending, impregnation or coating of chemicals selected from the group consisting of accelerators, catalysts or additives for promoting light degradation or biodegradation of the granules may be effective.

As the improver granules are free from danger for human health, it is preferable to select the chemicals for this purpose taking safety into consideration. The snow quality improver of the present invention may be colored with known pigments or dyestuffs.

As an aggregate of snow granules made from a colored improver looks beautiful, and a commercial value may be added to the snow aggregate. For example, a discrimination of ski runs by coloration for beginners, intermediate skiers or experts may add more fun.

Further, other additives such as antioxidants, ultraviolet absorbers, fluorescent additives and/or bacteria to accerelate the formation of snow crystals, nuclei, extending agents, friction improvers, and the like may be added, blended, coated or impregnated to the snow quality improver of the present invention.

The invention is further illustrated by the following examples which are set forth by way of illustration only and not by way of limitation.

Performance test procedures in the examples are as follows:

Deionized water absorbability

About 0.5 grams of a dried super absorbent polymer in granule form are dispersed in 1000 ml of deionized-water and allowed to stand for about 24 hrs, followed by filtration through a 60-mesh wire net. The water-swollen polymer granules are weighed to determine the weight (W). The weight of dried granules = $W_o$.

Absorbabilities (Table 1) are then calculated as follows:

$$\text{Absorbability} = \frac{W}{W_o}$$

Flowability after water absorption

About 1.0 grams of a dried super absorbent polymer are added to about 50 ml of deionized-water to absorb completely.

Flowabilities (Table 1) are evaluated visually under gentle vibration and reported as $\bigcirc$ X or $\Delta$.

Density of frozen artificial snow

Frozen snow with known volume is weighed and then densities (Table 1) are calculated as grams of frozen snow per volumes($cm^3$) of said snow. When the snow is hard, the volume calculated by measuring dimensions of a snow cube made by cutting frozen snow is used.

Strength of frozen artificial snow

Release a disk in an adapter to fall straight on the sample snow. Repeat the procedure by use of a "Kinoshita hardness tester" (trade name), changing the adapter so that the disk sinks to depth of about 7 to 30 mm under the snow. Calculate the strength by use of a conversion table. The feeling of snow is denoted, for example, by "powdery".

Preparation of super absorbent polymer in granule form

A 500 ml-separable flask equipped with a stirrer, a reflux condenser, a dropping funnel, a thermometer, and a nitrogen inlet tube, was charged with 150 grams of deionized -water, followed by addition of 0.2 grams of a partially saponified polyvinyl alcohol (trade name GH-23, made by Nippon z Syn. Chemical Co., Ltd.). After melting the contents, the flask was purged with a nitrogen stream.

Separately, an Erlenmyer flask was charged with 22.5 grams of a mixed ester of lauryl acrylate and dodecyl acrylate(trade name LTA, made by Osaka Organic Chem. Co., Ltd.), 10.0 grams of hydroxyethyl methacrylate, 17.5 grams of methylmethacrylate, 1.0 grams of azobis dimethyl valeronitrile, and the resulting solution was added dropwise into the above flask for about an hour under a bubbling of nitrogen. The heating was continued until the reaction neared completion, the contents were maintained at about 65° C. for 5 hours after cooling, and the resulting solids were filtered, washed, dried in vacuo to give a dispersant in bead state.

A 1000 ml-separable flask was charged with 360.7 grams of n-hexane, 4.32 grams of the above-mentioned disperant, and the resulting mixture was heated to 50° C. to dissolve the dispersant and the atmosphere was replaced with nitrogen.

Separately, 72.0 grams of acrylic acid was partially neutralized with 32.2 grams of sodium hydroxide dissolved in 103.6 grams of deionized-water and 0.24 grams of potassium persulphate were added at room temperature. The resulting monomer solution was added dropwise to the above-mentioned separable flask with stirring of 300 r.p.m. over a period of 1 hour under the bubbling of nitrogen. After refluxing for 2 hrs., 0.1 grams of 30% hydrogen peroxide solution was added and the refluxing was continued for a period of 1 hr. to complete the polymerization. Thereafter, 0.73 grams of ethyleneglycol diglycidylether were added, and the contents was dehydrated by azeotropic distillation, filtered and dried in vacuo so as to give a super absorbent polymer in white bead state.

The super absorbent polymer in bead form obtained had an average particle size of about 100 μm with a good flowability. When absorbing water with stirring at the room temperature for 19 seconds, a water-swollen polymer in bead form having water 50 times the weight of the dried polymer and an average particle size of about 0.4 mm with a good flowability was obtained. The resulting polymer beads could retain the water without releasing water even after allowing them to stand at room temperature.

The deionized-water absorbability was 100 times the weight of the dried polymer. Table 1 shows conventional absorbent polymers and some of the super absorbent polymers of the present invention which are denoted by "PQ Polymer", their particle sizes, and water absorbabilities.

EXAMPLE 1

Preparation of artificial snow in granule and an aggregate form

Water-swollen polymers in granule form made from conventional absorbent polymers (see the following table) in which case each of the water-swollen polymer (at about 19° C.) have water 50 times the dried weight of the polymer and a water-swollen absorbent polymer made from a super absorbent polymer of the invention (trade name PQ Polymer-BL-100) were filled fully individually in a wooden box, and frozen at a temperature of about −30° C. for a period of about 1 to 2 hrs. so as to give artificial snow in granule or an aggregate form. The following table gives the results.

| Absorbent Polymers in granule form | Absorption Ratio (times) | Artificial Snow Density (g/cm$^3$) | Strength (Kg/cm$^2$) |
|---|---|---|---|
| PQ Polymer BL-100 | 50 | 0.5 | 10 |
| Aqualic CA-W | 50 | 0.8 at least | 20 at least |
| Sumica Gel S-50 | 50 | 0.8 at least | 20 at least |
| Parma Snow Polymer | 50 | 0.8 at least | 20 at least |

Photographs attached are the transmission-type microscopic photographs (X=15) of the structures of these artificial snow in granule or an aggregate form.

Photograph No. 6 is the microscopic photograph of a structure of the artificial snow in granule and an aggregate forms of the present invention made from PQ Polymer BL-100 in which ice layers surrounding completely the frozen absorbent polymer granules form together ice granules which aggregate each other so as to give bottle gourds, among them fine, precise void spaces being distributed uniformly all over. There is a close resemblance between the granule structure of this artificial snow and the one of packed natural snow.

On the other hand, Photograph No. 3 is the microscopic photograph of an artificial snow made from Parma Snow (trade mark) polymer in which frozen water-swollen polymer granules (black regions) and ice constitute a harmonious whole and the polymer granules can not be distinguished from the ice phase. In this case, water-swollen polymer granules in bare state appears on the surfaces of snow granules and most of the void spaces are unevenly distributed in a large void (white regions). There are no bottle gourds formed from ice beads which exist in the natural snow in an aggregate form. Such a structure is entirely different from that of compact natural snow.

Photograph No. 4 is the microscopic photograph of an artificial snow made from Aqualic CA-W (trade name) in which frozen water-swollen polymer granules(black regions) and ice constitute a harmonious whole and the polymer granules can not distinguish from the ice phase. The snow structure seems like the structure shown in Photograph 3 as a whole.

Photograph No. 5 is the microscopic photograph of a structure of artificial snow made from Sumica-gel S-50 (trade name) in which water-swollen polymer granules (spherical regions) has been frozen as it is. The artificial snow seems to have somewhat different structure from that of snow shown in Photograph No. 3, but in fact there are many scars on the surface (black dendritic regions) of the polymer granule caused by breakage of the ice surrounding the polymer granule and bare surfaces of the polymer granules uncovered with ice appear on the surfaces of snow granules. There is little void space in the structure. The structure is also entirely different from the one of compact natural snow.

After storing the artificial snow in an aggregate form made from PQ Polymer BL-100 at about −1° C., changes in appearances with the passage of time are examined visually. The original state of the freshly prepared snow aggregate could retain intact.

EXAMPLE 2

Preparation of artificial snow (1) in an aggregate form

After placing dry ice under an aluminum plate having a thickness of 5 cm. cooled to below −40° C., a water-swollen super absorbent polymer(at about 19° C.) in bead form was placed on the plate over an area 10 cm.×10 cm., and frozen at room temperature of −8.3° C. for a period of about 1 to 2 hrs. Table 2 gives the results. The microscopic photograph of the structure of this snow in an aggregate form is given in Photograph No. 6.

Changes of the external appearance with the passage of time at −1° C. were observed visually. The appearance of the polymer freshly prepared could still be retained after about a month.

EXAMPLE 3

Preparation of artificial snow (2) in granule form

A water-swollen super absorbent polymer in bead form having water 50 times the weight of the dried polymer (at about 19° C.) in a quantity of 100 parts by weight was mixed with over 60 parts by weight of dry ice in granule form and resulting mixture was frozen at a temperature of −8.3° C. for 155 minutes with stirring using mechanical mixer (trade name Hitachi Handmixer HF-330, made by Hitachi Co., Ltd.) so as to give artificial snow in granule form. Table 3 shows the results. Photograph No. 6 gives the microscopic structure of the snow granules. Changes of the external appearance with the passage of time at −1° C. were observed visually. Upon allowing to stand, the appearance of the snow freshly prepared could still be retained after about one month.

EXAMPLE 4

Colored artificial snow in an aggregate form

A water-swollen super absorbent polymer (made from PQ BL-100) in bead form colored pink with a dyestuff and having water 50 times the weight of the dried polymer (at about 19° C.) was frozen according to Example 3 so as to give powdery artificial snow in an aggregate from. Artificial snow vividly colored pink was obtained.

EXAMPLE 5

Colored and odored artificial snow in an aggregate form

A water-swollen super absorbent polymer (made from PQ BL-100) in bead form colored pink with a dyestuff and odored with a perfume of rose, having water 50 times the weight of the dried polymer (at about 19° C.) was frozen according to Example 3 so as to give powdery artificial snow in an aggregate form. Artificial snow vividly colored pink and having an odor of rose was obtained.

EXAMPLE 6

Preparation of artificial snow in an aggregate form (3)

A water-swollen super absorbent polymer in bead form having water 50 times the weight of the dried polymer (at about 19° C.) in a quantity of 100 parts by weight was mixed with 100 parts by weight of liquid carbon dioxide and the resulting mixture was frozen at a temperature of $-8.3°$ C. for about 155 minutes with stirring by using a mechanical mixer (trade name Hitachi Hand-mixer HF-330, made by Hitachi and Co., Ltd.) so as to give artificial snow in an aggregate form. Powdery artificial snow having a density of 0.33 g/cm$^3$ and a temperature of $-9.7°$ C. was obtained.

A mixture of a water-swollen super absorbent polymer in granule form having water 50 times the weight of the dried polymer (at about 19° C.) with icy snow (blending ratio of 25:75) in a quantity of 100 parts by weight was mixed with 200 parts by weight of liquid carbon dioxide and the resulting mixture was frozen in a similar manner for about one minute with stirring so as to give artificial snow. Powdery artificial snow having a density of 0.31 g/cm$^3$ and a temperature of $-10°$ C. was obtained. Photograph No. 6 shows the microscopic structure of the snow granules. Changes of the external appearance with the passage of time at $-1°$ C. were observed visually. The appearance of the polymer freshly prepared could still be retained after about one month.

EXAMPLE 7

Preparation of artificial snow covers used to cover ski slope

A water-swollen super absorbent polymer in granule form obtained in the method aforesaid which has water of about 50 times the weight of the dried polymer at about 19° C., or a mixture of said polymer with icy snow or dried ice was filled fully in a wooden box having a dimension of 3 cm depth, 30 cm length and 20 cm width, and the contents were frozen at a temperature of about $-30°$ C. in a refrigerator for a period of about 1 to 2 hrs. to give artificial snow covers used to be cover ski slopes. Photograph No. 6 gives the microscopic structure of the snow granules.

The snow was allowed to stand at a temperature of $-0°$ C. for about one month, and changes with the passage of time were observed. The initial state of snow could be retained intact even after about one month.

COMPARATIVE EXAMPLE 1

The water swollen super absorbent polymer in granule form of Example 6 or a mixture of said polymer with icy snow or dried ice was filled fully in a wooden box having a dimension of 20 cm width, 30 cm length, 6 cm. depth and in a conventional basket in fully, and frozen in a refrigerator at a temperature of $-30°$ C. for about 1 to 2 hrs. As the results, artificial snow in an aggregate form was not obtained, but an ice block or a crust of snow in "Eisbahn" state was obtained.

EXAMPLE 8

Creation of artificial snow slope for skiing

About 20 kg of dried ice in fine fragments were scattered over a wooden ski slope covered with a foamed polystyrene (3 cm thickness) comprising a slope section (about 40 cm width, a tilt angle of 10 deg., about 4 m length and a plain section of about 2 m length) continuously extending from said slope section. Thereafter, the dried ice layer was covered all over with the snow covers made in Example 6 (about 20 cm width, about 30 cm length, about 3.3 cm thickness each) so as to make a continuous snow cover on the slope.

Separately, a mixture of about 100 parts by weight of a water swollen super absorbent polymer in granule form having water 50 times the weight of the dried polymer with 60 parts by weight of dried ice in fragments were frozen with stirring for about 5 minutes at a temperature of $-8.3°$ C. The continuous snow cover aforesaid was covered with the resulting powdery and crispy artificial snow all over to a depth of about 4 cm to make an artificial snow slope for skiing. The sliding conditions for skiing on the slope were evaluated at an outside temperature of about 21° C. and a temperature of the snow of about $-10°$ to $-30°$ C. The snow conditions for skiing on the artificial slope were found to be excellent and sliding acceleration properties were essentially the same as that of the slope covered with natural powder snow. The excellent sliding conditions for skiing could still be retained even when the temperature of the snow varied widely from about $-10°$ to $-30°$ C. and even after the surface snow became partially gelatinaized by melting.

It was difficult for a skier to step up the slope without using ski poles. However, a ski pole firmly sticking to the snow was possible. The ski's edges gripped firmly in the snow and the artificial snow under the skis gave a sound "SQUEAKING" when treading by skis on the snow. When the surface of the artificial snow was partially melted and formed a gel, an addition of dry ice in fragments could make the surface powdery in snow quality again. The repetition of the process could keep the slope in good skiing conditions for a longer term.

The evaluation was repeated by using commercial absorbent polymers, for example, Aqualic CA-W, Sumica Gel S-50 and Parma Snow Polymer. The resulting snow was icy and the sliding properties on that snow were poor.

EXAMPLE 9

Type of super absorbent polymer used to make snow quality improver

Water-swollen super absorbent polymer in granule form having a water content of 50 times the weight of the dried super absorbent polymer (snow quality improver) was blended with icy snow (about 16 mesh) made by crushing an ice block into fragments in a weight ratio of 33:100, followed by freezing at −5° C. After 16 hrs., the densities and strengths of the snow compositions were measured. Table 1 shows the results. The microscopic photograph of the structure of this artificial snow in an aggregate form was similar to that shown in Photograph No. 6 (as well as the snow obtained in the following Examples).

EXAMPLE 10

Average particle diameter of snow quality improver

The same procedure of Example 9 was repeated to give an artificial snow except that average particle diameter of the super absorbent polymer in granule form was changed. Table 6 shows the results.

EXAMPLE 11

Water absorbability of snow quality improver

The same procedure of Example 9 was repeated to give artificial snow except that water absorbability of the super absorbent polymer was changed. Table 7 gives the results.

EXAMPLE 12

Weight ratio of snow quality improver

The same procedure of Example 9 was repeated to give artificial snow except that weight ratio of the water-swollen polymer to icy snow was changed. The results are shown in Table 8.

EXAMPLE 13

Sliding test on a slope at Teine Ski Area in Hokkaido(Japan)

An artificial ski slope (3 meters width, 15 meters length, 15 cm depth) was covered with a homogeneous mixture of about 33 parts by weight of a water-swollen super absorbent polymer in granule form (made from "PQ Polymer Bl-151", trade name) containing water about 50 times the weight of the dried polymer and about 100 parts by weight of natural snow. After allowing to stand for about 14 hrs at −5° to 12° C., the density, strength and suitability for sliding were measured and evaluated. Table 9 gives the results.

EXAMPLE 14

Super absorbent polymer before water absorption

A super absorbent polymer before water absorption was blended with icy snow made by crushing an ice block (about 16 mesh) and change of the density as well as the strength with the passage of time were measured after storage at about −1° C. The results are shown in Table 10.

EXAMPLE 15

Colored super absorbent polymer

Icy snow (16 mesh) made by bursting ice blocks into fragments was blended in a weight ratio of 33:100 with a water-swollen super absorbent polymer colored pink with an artificial dyestuff wherein said polymer contained water 50 times the weight of the dried polymer. When freezing the mixture, artificial snow lightly colored pink was obtained. The density and strength were the same as those obtained in Example 9. H

TABLE 1

| Absorbent Polymers | Makers | Type | Water Absorbability (Times) | Average particle Size (μm) Water Absorption Before | Average particle Size (μm) Water Absorption After 50 Times | Flowability After Water Absorption | Angle of Rest |
|---|---|---|---|---|---|---|---|
| PQ-Polymer-* BL-100 | Osaka Org. Chem. Ind. Co. | Polyacrylic Acid Salt | 100 | 100 spherical | — | ◯ good | 35° |
| PQ-Polymer-* PL-100 | Osaka Org. Chem. Ind. Co. | Polyacrylic Acid Salt | 100 | 30 spherical | 100 spherical | ◯ good | — |
| PQ-Polymer-* BL-100 | Osaka Org. Chem. Ind. Co. | Polyacrylic Acid Salt | 100 | 100 spherical | 400 spherical | ◯ good | 60° |
| PQ-Polymer-* BL-151 | Osakda Org. Chem. Ind. Co. | Polyacrylic Acid Salt | 100 | 400 spherical | 1500 spherical | ◯ good | — |
| PQ-Polymer-* BL-150 | Osaka Org. Chem. Ind. Co. | Polyacrylic Acid Salt | 400 | 1000 spherical | 3500 spherical | ◯ good | — |
| Sumica-Gel S-50 | Sumitomo Chem. Co. | Vinylalcohol-Acrylic Acid Salt Copolymer | 500 | 200 spherical | — | X poor | — |
| POLIZ SA-20 | Kao Co. | Polyacrylic Acid Salt | 420 | 50–100 spherical | — | X poor | — |
| KI-Gel 201 K | Kuraray Co. Ltd. | Isobutylene-Maleic Anhydride Copolymer** | 200 | 50–100 spherical | — | X poor | — |
| AQUALIC CAW | Nippon Shokubai Co. | Polyacrylic Acid Salt | 260 | 50–300 fragments | — | △ fair | — |

* PQ Polymer: Polyacrylic acid salt-type super absorbent polymer
** Partially saponified

TABLE 2

| Artificial Snow Seed | Layer Thickness (mm) | Density (g/cm³) | External Appearance of Snow | Strength (kg/cm²) |
|---|---|---|---|---|
| BL-100 (water absorption 50 times) | 37–41 | 0.34 | cluster or aggregate of snow particles | break |
| BL-151 (water absorption 50 times) | 28–31 | 0.41 | cluster or aggregate of snow particles | break |
| PL-100 (water absorption 50 times) | 28–31 | 0.76 | hard | break |
| BL-100 (wa- | — | — | powdery | — |

TABLE 2-continued

| Artificial Snow Seed | Layer Thickness (mm) | Density (g/cm³) | External Appearance of Snow | Strength (kg/cm²) |
|---|---|---|---|---|
| ter absorption 50 times)/icy snow = 25/75 (Wt. Ratio) | | | snow | |
| BL-151 (water absorption 50 times)/icy snow = 25/75 (Wt. Ratio) | — | — | splinkling snow | — |

TABLE 3

| Artificial Snow Seed | Snow Seed/ Dried Ice (Wt. Ratio) | Density (g/m³) | External Appearance of Snow | Temperature of artificial Snow °C. |
|---|---|---|---|---|
| BL-100 (water absorption 50 times) | 1.0 | — | powdery | −30 |
| BL-100 (water absorption 50 times) | 0.6 | 0.33 | powdery | −9.7 |
| BL-151 (water absorption 50 times) | 0.6 | 0.36 | powdery | −4.0 |
| PL-100 (water absorption 50 times) | 0.6 | 0.39 | slimy | −15 |
| BL-100 (water absorption 50 times) BL-100/icy snow = 25/75 (Wt. Ratio) | 0.34 | 0.31 | powdery | −30 |

TABLE 4

| Artificial Snow Seed | Layer Thickness (mm) | Density (g/cm³) | External Appearance of Snow | Strength (kg/cm²) |
|---|---|---|---|---|
| BL-100 (water absorption 50 times) | about 33 | 0.34 | aggregate of snow particles | 4 |
| BL-151 (water absorption 50 times) | about 33 | 0.41 | aggregate of snow particles | 5 |
| PL-100 (water absorption 50 times) | about 33 | 0.76 | hard aggregate of snow particles | 6 |
| BL-100 (water absorption 50 times)/icy snow = 90/10 (Wt. Ratio) | about 33 | 0.40 | aggregate of snow particles | 5 |
| BL-151 (water absorption 50 times)/icy snow = 95/5 (Wt. Ratio) | about 33 | 0.36 | aggregate of snow particles | 4 |

TABLE 5

| Absorbent Polymer Trade Name | Maker | Type | Water Absorbability (Times) | Particle Size Average (μm) | Flowability after Water Absorption | Density (g/cm³) | Strength (kg/cm³) | state |
|---|---|---|---|---|---|---|---|---|
| PQ-Polymer-BL-100 | Osaka Org. Chem. Ind. Co. | A | 100 | 100 spherical | ○ good | 0.43 | 5.2–7.2 | homogeneous |
| Sumica-Gel S-50 | Sumitomo Chem. Co. | B | 500 | 200 spherical | X poor | 0.42 | 5.6–6.4 | species slightly |
| POLYZ SA-20 | Kao Co. | A | 420 | 50–100 spherical | X poor | 0.41 | 3.3–4.0 | species slightly |
| KI-GEL 201 K | Kuraray Co. | C | 200 | 50–100 spherical | X poor | 0.43 | 3.6–6.2 | species slightly |
| AQUALIC CAW | Nihhon Shokubai Co. | A | 260 | 150–300 fragments | Δ fair | 0.46 | 7.6–11.0 | species all over |
| None | — | — | — | — | — | 0.32 | 0.2–0.3 | — |

Icy snow: Water-swollen absorbent polymer (weight ratio) = 100:33
A = Polyacrylic acid salt
B = Vinylalcohol-acrylic acid salt copolymer
C = Partially saponified isobutylene-maleic anyhdride copolymer

TABLE 6

| Super Absorbent Polymer Trade Name | Particle Size Average (μm) | Flowability after Water Absorption | Density (g/cm³) | Strength (kg/cm³) | state |
|---|---|---|---|---|---|
| PQ-Polymer* | | | | | |
| PL-200 | 10 | X poor | 0.42 | 4.5–7.0 | species all over |
| PL-100 | 25 | ○ good | 0.45 | 7.5–14.0 | homogeneous |
| BL-100 | 100 | ○ good | 0.43 | 5.2–7.2 | homogeneous |
| BL-151 | 300 | ○ good | 0.43 | 3.1–3.3 | homogeneous |
| BL-150 | 1000 | ○ good | 0.40 | 1.8–2.5 | separation of polymer from snow |

*Type A made by Osaka Organic Chemical Ind. Co.
Water absorbability = 100 times

TABLE 7

| Super Absorbent Polymer Trade Name | Water Absorbability (Times) | Flowability after Water Absorption | Density (g/cm³) | Strength (kg/cm³) | state |
|---|---|---|---|---|---|
| PQ-Polymer* | | | | | |

TABLE 7-continued

| Super Absorbent Polymer Trade Name | Water Absorbability (Times) | Flowability after Water Absorption | Density (g/cm³) | Strength (kg/cm³) | state |
|---|---|---|---|---|---|
| BL-100 | 100 | ○ good | 0.43 | 5.2-7.2 | hompgeneous |
| BM-100 | 230 | △ fair | 0.44 | 4.5-10.0 | homegeneous |
| BH-100 | 450 | X poor | 0.48 | 6.3-7.2 | species slightly |

*Type A made by Osaka Organic Chemical Ind. Ltd. Co.

TABLE 8

| Icy Snow (parts by wt.) | Water swollen Super absorbent Polymer (parts by wt.) | Density (g/cm³) | Strength (kg/cm²) | State |
|---|---|---|---|---|
|  | (BL-100 50 Times) |  |  |  |
| 100 | 33 | 0.43 | 5.2-7.2 | homogeneous |
| 100 | 54 | 0.43 | 5.5-8.5 | homogeneous |
| 100 | 100 | 0.44 | 34-44 | homogeneous but "Eisbahn" |
| 100 | 200 | 0.49 | 76-100 | homogeneous but "Eisbahn" |
|  | (BL-151 50 Times) |  |  |  |
| 100 | 11 | 0.42 | 1.7-2.4 | homogeneous |
| 100 | 33 | 0.43 | 3.1-3.3 | homogeneous |
| 100 | 100 | 0.42 | 3.6-4.4 | homogeneous |
| 100 | 200 | 0.44 | 7.9-11.0 | homogeneous |

TABLE 9

| Snow Composition (Parts by Weight) | Natural Snow/BL-150 (Water 50 times) = 100/33 | Natural Snow |
|---|---|---|
| Density (g/cm³) | 0.45 | 0.33 |
| Strength (kg/cm²) | 7.4 | 2.6 |
| Sliding Time (sec.)* | 4.75 | 5.23 |

*Straight-down sliding time for a 15-meter slope
Density and strength could be increased easily by blending the water swollen polymer and suitability for sliding was also improved.

TABLE 10

| Icy snow (Parts by wt.) | BL-151 (Parts by wt.) | Time after Blending | Density (g/cm³) | Strength (kg/cm²) | State |
|---|---|---|---|---|---|
| 100 | 0 | 16 hrs. | 0.32 | 0.2-0.3 | homogeneous |
|  |  | 35 days | 0.38 | 3.0-3.7 | corn snow |
| 100 | 0.5 | 16 hrs. | 0.32 | 0.1-0.3 | homogeneous |
|  |  | 35 days | 0.36 | 1.8-2.6 | homogeneous |
| 100 | 1.0 | 16 hrs. | 0.32 | 0.2-0.3 | homogeneous |
|  |  | 35 days | 0.37 | 2.5-2.8 | homogeneous |

When dried super absorbent polymer was added, an efffect to prevent a change with the passage of time was observed.

What is claimed is:

1. An artificial snow granule comprising:
   a nucleus consisting of a super absorbent polymer in granule form; and
   an ice layer surrounding said nucleus.

2. An artificial snow granule according to claim 1 wherein said super absorbent polymer retains its original granule form after water absorption without sticking to other granules, and has a deionized-water absorbability of about 30 to 500 times the weight of the dry polymer, and an average particle size of about 20 to 500 μm before water absorption and about 0.05 to 5 mm after water absorption.

3. An artificial snow granule according to claim 1 wherein said super absorbent polymer has an average particle size of about 0.05 to 5 mm after water absorption, and the weight ratio of ice to said super absorbent polymer is about 5 to 100.

4. An artificial snow granule according to claim 1 wherein said super absorbent polymer is selected from the group consisting of light degradable polymers and biodegradable polymers.

5. An artificial snow granule according to claim 1 wherein said super absorbent polymer is either odored or colored.

6. An artificial snow granule according to claim 1 wherein said super absorbent polymer is selected from the group consisting of polyacrylic acid salts, vinylalcohol-acrylic acid salt copolymers, and saponified isobutylene-maleic anhydride copolymers.

7. An artificial snow granule according to claim 1 wherein said granule constitutes a component of a mixture with a component selected from the group consisting of natural snow, conventional artificial snow and icy snow.

* * * * *